United States Patent

[11] 3,624,709

| [72] | Inventor | John P. Petrek |
| | | Kennewick, Wash. |
| [21] | Appl. No. | 886,631 |
| [22] | Filed | Dec. 19, 1969 |
| [45] | Patented | Nov. 30, 1971 |
| [73] | Assignee | The United States of America as represented by the United States Atomic Energy Commission |

[54] CONTINUOUS-READING PLUGGING-TEMPERATURE METER
8 Claims, 1 Drawing Fig.

[52] U.S. Cl. ............................................. 73/61 LM, 73/15 R
[51] Int. Cl. ............................................. G01n 11/00, G01n 25/02
[50] Field of Search ............................................. 73/61, 17 R, 15 R

[56] References Cited
UNITED STATES PATENTS

| 2,997,874 | 8/1961 | Billuris et al. ............... | 73/61 |
| 3,002,820 | 10/1961 | Hall et al. ............... | 73/61 UX |
| 3,200,637 | 8/1965 | Ballou et al. ............... | 73/61 |
| 3,222,916 | 12/1965 | Davis ............... | 73/15 R |
| 3,340,725 | 9/1967 | Wikinson ............... | 73/61 |
| 3,343,401 | 9/1967 | Delisle ............... | 73/61 X |
| 3,462,997 | 8/1969 | Roach et al. ............... | 73/61 |
| 3,481,181 | 12/1969 | Roach ............... | 73/61 |

FOREIGN PATENTS

| 21,204 | 12/1966 | Japan ............... | 73/61 |
| 21,960 | 9/1965 | Japan ............... | 73/61 |

Primary Examiner—Louis R. Prince
Assistant Examiner—Joseph W. Roskos
Attorney—Roland A. Anderson ABSTRACT: A continuous-reading plugging-temperature meter includes an orifice in the flow path of a liquid metal. Prior to its passage through the orifice, the liquid metal first is cooled to a temperature below that at which impurities in the liquid metal will deposit on the orifice and then is reheated to a steady-state condition in which impurities going out of solution on the orifice equal those going into solution. Reheating is accomplished with part of the flow of liquid metal which has not been cooled. The uncooled liquid metal passes through a spring-loaded valve before reheating the cooled liquid metal. As the orifice becomes more or less plugged due to changes in the impurity content of the liquid metal, the pressure of liquid metal on the spring-loaded valve changes and the amount of hot liquid metal available for heating the cooled liquid metal changes. The temperature of the liquid metal near the orifice thus gives an indication of the impurity content of the liquid metal.

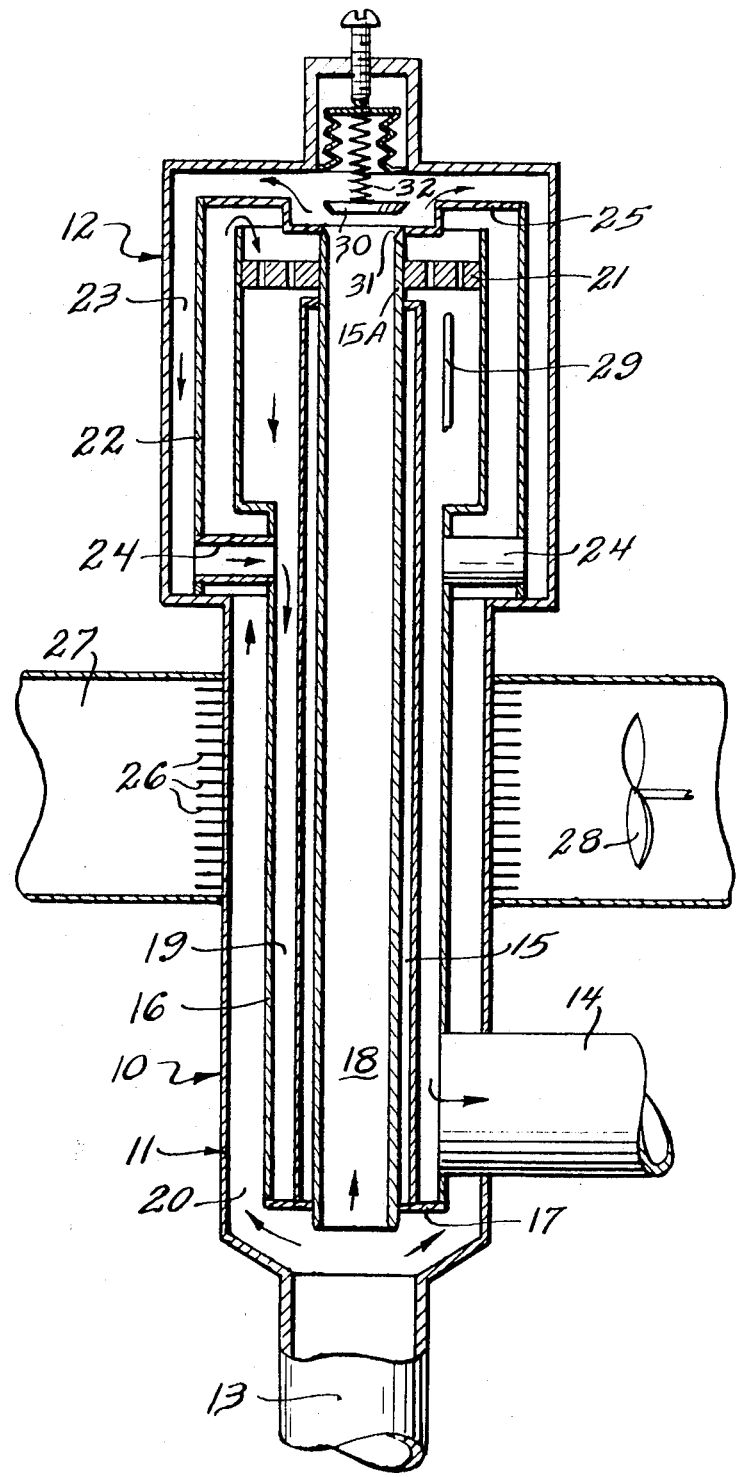

3,624,709

CONTINUOUS-READING PLUGGING-TEMPERATURE METER

CONTRACTUAL ORIGIN OF THE INVENTION

The invention described herein was made in the course of, or under, a contract with the U.S. Atomic Energy Commission.

BACKGROUND OF THE INVENTION

This invention relates to a method and device for continuously determining the concentration of an impurity in a liquid metal. In more detail, the invention relates to the continuous determination of the concentration of oxygen in sodium.

Liquid metals are very useful as heat transfer fluids in high-temperature systems. For example, sodium is expected to be the coolant used in large, fast-breeder reactors now being planned, since it has very favorable physical, chemical and nuclear properties. Experimental use of sodium in test reactors—and other tests—has shown, however, that sodium, as well as other alkali metals, picks up oxygen from its environment. The oxygen may come from air that has leaked into the system or it may come from metal oxides present in the conduit walls of the system. While a small proportion of oxygen can generally be tolerated in sodium or other metals used as a heat transfer fluid, larger amounts may cause trouble due to the tendency of the metal oxide to deposit on conduit walls if the temperature of the sodium at some place in the system is less than the saturation temperature for sodium oxide. This, of course, decreases the efficiency of the coolant and might ultimately result in complete failure of the system. Thus an essential feature of a liquid-metal-cooled reactor is a monitoring device for determining the proportion of oxygen in the liquid metal. If the monitoring device indicates that the proportion of oxygen is too high, the amount of oxygen in the sodium can be reduced by use of a "getter" or by cold trapping.

It will be appreciated that the impurity content of impurities other than oxygen can also be determined by this monitoring device. For example, calcium is an impurity which may be present in sodium. In fact, any impurity can be detected whose solubility in the liquid metal is temperature dependent.

The impurity content of a liquid-metal system may be ascertained by well-known analytical methods. However, these methods require that the system be opened to remove a sample, thus, possibly, introducing further impurity into the system. Such methods, of course, also are not normally continuous.

Other methods have been developed making use of the temperature dependence of the solubility of the impurity in the liquid metal. These devices are called plugging meters. In general, according to these procedures, an orifice is provided in the flow path of the liquid metal and the liquid metal is cooled prior to its passage through the orifice. Plugging of the orifice indicates that the impurity is not completely soluble at the lower temperature of the cooled liquid metal. The plugging temperature of samples of known impurity content can be determined and this information charted. Then the impurity content of a liquid metal of unknown impurity content can be easily determined by referring to the chart. Various arrangements of this type have been suggested making use of variations in the flow rate of the liquid metal, the pressure drop of the liquid metal through the orifice or the temperature at the orifice to detect incipient plugging of the orifice.

Obviously once the orifice plugs up no further information can be obtained from a plugging meter until the liquid again flows through the orifice. This can be accomplished, for example, by ceasing to cool the liquid metal as is done in U.S. Pat. No. 3,070,994 to Kelley et al., or by increasing the size of the orifice as is done in U.S. Pat. No. 3,200,637 to Ballou et al. It will be observed that Kelley et al., typifies the most usual form of plugging meter which does not give a continuous reading of the impurity content.

It is accordingly an object of the present invention to develop a device for determining continuously the amount of an impurity that is dissolved in a liquid metal.

It is another object of the present invention to develop a continuous-reading oxide plugging meter for liquid metals.

It is still another object of the present invention to develop a continuous-reading oxide plugging meter in which the temperature of liquid metal at the orifice is maintained at the impurity saturation point.

It is also an object of the present invention to develop a process for determining the impurity content in a liquid metal.

A more detailed object of the present invention is to develop a process for determining the amount of oxygen in liquid sodium.

SUMMARY OF THE INVENTION

In the plugging meter of the present invention a liquid metal stream—such as a stream of sodium—is split between two flow paths, one of which includes an orifice plate in the path of flow of the liquid metal. Prior to its passage through the orifice plate, the liquid metal in the one flow path is cooled and then is reheated by heat exchange with the uncooled liquid metal in the other flow path to the temperature at which impurities going out of solution on the orifice plate equal those going into solution. The temperature is maintained at this impurity saturation level regardless of the impurity content of the liquid metal by providing a force-loaded valve in the flow path of the uncooled liquid metal which meters the amount of uncooled liquid metal utilized for reheating the cooled liquid sodium. Differences in the degree of plugging of the orifice plate cause changes in the pressure exerted on the force-loaded valve by the uncooled liquid metal which varies the amount of reheating of the cooled liquid metal. Measurement of the temperature of the liquid metal at the orifice plate thus gives an indication of the impurity content of the liquid metal.

BRIEF DESCRIPTION OF THE DRAWING

The single FIGURE of the drawing is a schematic view of a continuous-reading plugging meter according to the present invention.

DESCRIPTION OF THE PREFERRED EMBODIMENT

The plugging meter comprises a housing 10 including an economizer portion 11 of lesser diameter and a reheat portion 12 of greater diameter. The meter is provided with an inlet conduit 13 feeding liquid metal axially into the meter at the lower end of the meter and an outlet conduit 14 extending transversely of housing 10 near the lower end of the housing.

Extending longitudinally of housing 10 and coaxial therewith are a double-walled tube 15—having a short single-wall extension 15A at the top thereof—serving as a thermal barrier and a cylindrical flow divider 16 between housing 10 and double-walled tube 15. Double-walled tube 15 and flow divider 16 terminate just below the top of housing 10, are joined at the bottom by annular plate 17 and define an axial inlet passageway 18, an annular outlet passageway 19, and a peripheral inlet passageway 20. Outlet conduit 14 communicates with outlet passageway 19 near the bottom thereof.

An annular orifice plate 21 of conventional design is disposed in annular outlet passageway 19 near the top thereof, transverse to the flow of liquid metal. To make room for the orifice plate, the top portion of flow divider 16 is larger in diameter than is the remainder of the flow divider. In reheat portion 12 of housing 10 a second, short, cylindrical flow divider 22 is spaced from housing 10 to define a peripheral outlet passageway 23 which communicates with annular outlet passageway 19 by way of several radial passageways 24. Flow divider 22 is joined to double-walled tube 15 at the top thereof by annular plate 25.

Cooling of the liquid metal flowing upwardly in peripheral inlet passageway 20 is accomplished by blowing air over housing 10 and fins 26 located thereon through air passage 27 by fan 28. The temperature of the liquid metal immediately after it flows through orifice plate 21 is continuously monitored by thermocouple 29. The flow of uncooled liquid metal from axial inlet passageway 18 over the cooled liquid metal before it passes through the orifices in orifice plate 21 is metered by valve 30 which cooperates with valve seat 31. Valve 30 is urged toward valve seat 31 by spring 32 which is set so that there is a constant flow of liquid metal through the valve.

The flow path of liquid metal through the plugging meter will next be described. Entering housing 10 from inlet conduit 13 the stream of liquid metal divides into two flow paths, one traversing axial inlet passageway 18 and the other traversing peripheral inlet passageway 20. In economizer portion 11 of housing 10 the liquid metal in peripheral inlet passageway 20 gives up heat to liquid metal in annular outlet passageway 19 and to air being blown through air passage 27. In reheat portion 12 of housing 10 is reverses direction and flows through orifice plate 21 after having been reheated by liquid metal from axial inlet passageway 18. It then flows downwardly through annular outlet passageway 19, taking up heat from liquid metal in peripheral inlet passageway 20, and departs from the meter by outlet conduit 14. Liquid metal flowing upwardly in axial inlet passageway 18 retains most of its heat due to the presence of double-walled tube 15 surrounding it which serves as a thermal barrier. The hot liquid metal flows past valve 30, reheats the cooled liquid metal in reheater portion 12 of housing 10, flows downwardly through peripheral outlet passageway 23 and rejoins the main flow of liquid metal in annular outlet passageway 19 after passing through radial passageway 24.

In operation, valve 30 is adjusted so that that portion of hot liquid metal will pass therethrough which will reheat the cooled liquid metal about to pass through orifice plate 21 to the temperature at which impurities depositing on the plate equal those going into solution form the plate. When the impurity content of the liquid metal rises, the plugging temperature rises. This causes additional deposit to form on the orifice in orifice plate 21, reduces the flow rate through the plate and increases the pressure behind the plate. This increased pressure also shows up in axial inlet passageway 18, and causes valve 30 to open, permitting additional hot liquid metal to flow past the cooled liquid metal prior to its passage through orifice plate 21. The temperature of the liquid metal passing through orifice plate 21 rises until another equilibrium between impurities going out of solution and impurities going into solution is established. The new equilibrium temperature affords an indication of the impurity content of the liquid metal. In the reverse process, when a decrease in impurity content level occurs in the flowing stream, the degree of plugging of orifice plate 21 reduces, creating a lower pressure behind the orifice plate and in axial inlet passageway 18. This causes valve 30 to close partially and less hot liquid metal is available to reheat the cooled liquid metal. Thus the temperature of the liquid metal goes down until another equilibrium is established.

As is true in other plugging meters which give a quantitative measure of the amount of impurities present, appropriate calibration curves must be established using liquid metals of known impurity content. The temperature given by thermocouple 29 when applied to these calibration curves then indicates continuously the impurity content level of the liquid metal.

It will be understood that the invention is not to be limited to the details given herein but that it may be modified within the scope of the appended claims.

The embodiments of the invention in which an exclusive property or privilege is claimed are defined as follows:

1. A continuous-reading plugging-temperature meter comprising means for dividing a stream of a liquid metal into two separate flow paths, an orifice plate in one of said flow paths, means located upstream of the orifice plate for cooling the liquid metal in the flow path containing said orifice plate, the other flow path being uncooled, means for heating the liquid metal in said flow path containing said orifice plate just before it passes through the orifice plate by heat exchange with the liquid metal in the other flow path, means for adjusting the relative proportion of flow in the two flow paths dependent on the amount of plugging in the orifice plate and means for detecting the temperature just downstream of the orifice plate.

2. A meter according to claim 1 wherein said means for dividing a stream of liquid metal into two separate flow paths comprises a double-walled tube dividing the stream of liquid metal into an axial flow path and a peripheral flow path.

3. A meter according to claim 2 wherein a cylindrical flow divider is disposed between the double-walled tube and the housing surrounding the meter, and the orifice plate is disposed in the top of the annular outlet passageway between the cylindrical flow divider and the double-walled tube.

4. A meter according to claim 3 and including a short cylindrical flow divider in the upper portion of the meter defining a peripheral outlet passageway and a annular plate joining the top of the short flow divider to the top of the double-walled tube, said means for adjusting the relative flow of liquid in the two flow paths comprising a force-loaded valve which cooperates with a valve seat located at the intersection of an extension of the double-walled tube and the said annular plate to determine the rate of flow of uncooled liquid metal past the cooled liquid metal just before it passes through the orifice plate.

5. A continuous-reading plugging-temperature meter comprising a housing enclosing a lower economizer portion and an upper reheat portion of greater diameter, a double-walled tube extending from the bottom of the housing to a point near the top of the housing, a cylindrical flow divider having an enlarged section within the reheat portion of the meter disposed between the double-walled tube and the housing, an axial inlet passageway, an annular outlet passageway, and a peripheral inlet passageway thus being defined, a short cylindrical flow divider disposed in the reheat portion of the meter defining a peripheral outlet passageway, a plurality of radial tubes connecting said peripheral outlet passageway with said annular outlet passageway, an annular orifice plate disposed in said annular outlet passageway near the top thereof, said housing being closed at the top, an annular plate extending between the short cylindrical flow divider and an extension of the double-walled tube, a spring-loaded valve cooperating with a valve seat at the intersection of the extension of said double-walled tube and said annular plate to establish the rate of flow of liquid metal through said axial passageway and thus past the liquid metal passing through the orifice plate, an inlet pipe delivering liquid metal to said axial inlet passageway and said peripheral inlet passageway, an outlet pipe communicating with the lower end of said annular outlet passageway, means for cooling the peripheral inlet passageway, and means for determining the temperature of the liquid metal passing through the orifice plate.

6. A method for determining the concentration of an impurity in a liquid metal comprising dividing a stream of said liquid metal into two flow paths, cooling the liquid metal in one of said flow paths to below the impurity saturation temperature, passing said cooled liquid metal in heat exchange relationship to the uncooled liquid metal in the other flow path, passing the reheated stream through an orifice plate, and adjusting the distribution of liquid metal between the two streams so that the reheated liquid metal passes through the orifice plate at or slightly above the impurity saturation temperature.

7. A method according to claim 6 wherein the liquid metal is sodium and the impurity is oxygen.

8. A method according to claim 7 wherein the distribution of liquid metal between the two streams is determined by the pressure drop of liquid metal passing through the orifice plate.

* * * * *